Patented Dec. 30, 1941

2,268,418

UNITED STATES PATENT OFFICE 2,268,418

DETERIORATION RETARDER

Philip T. Paul, Naugatuck, Conn., assignor, by mesne assignments, to United States Rubber Company, New York, N. Y., a corporation of New Jersey No Drawing. Application June 17, 1938,
Serial No. 214,318

4 Claims. (Cl. 260—802)

This invention relates to a new class of deterioration retarders.

An object of the invention is to provide a new class of anti-oxidants or age resistors for organic substances which tend to deteriorate by absorption of oxygen from the air, for example, goods of rubber or allied gums, unsaturated fatty oils such as unsaturated vegetable oils, essential oils, petroleum oils and their derivatives such as gasolines, soaps, aldehydes, synthetic resins, turpentine, paints and varnishes containing drying oils, and the like. A further object of the invention is to provide chemicals which additionally act as flex improvers or anti-flex cracking agents for vulcanized rubber such as tire treads which undergo repeated strains during use. Further objects will be apparent from the following description.

According to the invention, the organic substance is treated with a product of reaction of an aliphatic ketone with an amine having the general formula

wherein $R_1$ and $R_2$ are each a substituted or unsubstituted aryl radical, and $R_3$ is an alkyl group. $R_1$ and $R_2$ are each preferably an unsubstituted aryl radical selected from the benzene, naphthalene, or biphenyl series, but each may be further substituted by such groups as halogen, amino, hydroxyl, secondary or tertiary alkyl amino, secondary or tertiary aryl amino, alkyl, aryl, mercapto, thialkyl, alkoxy or aryloxy.

By "an aryl group" herein is meant an aromatic hydrocarbon radical, whether further substituted or not in the nucleus, and having a free valence which belongs to the nucleus.

Examples of such products are the products from reacting the following ketones and tertiary amines:

Acetone and N-methyl diphenylamine
Acetone and N-ethyl diphenylamine
Acetone and N-methyl phenyl beta naphthylamine
Acetone and N-ethyl phenyl beta naphthylamine
Acetone and N-methyl p-isopropoxy diphenylamine
Acetone and N-ethyl p,p' dimethoxy diphenylamine
Acetone and N-propyl p-isopropyl diphenylamine
Acetone and N-butyl p,p'dichlorodiphenylamine
Acetone and N-amyl p-phenyl diphenylamine
Acetone and N-hexyl p-phenoxy diphenylamine
Acetone and N-ethyl p-allyloxy diphenylamine In place of acetone, other aliphatic ketones may be reacted with any of the tertiary amines above, for example, methyl ethyl ketone, methyl butyl ketone, methyl hexyl ketone, ethyl isobutyl ketone, mesityl oxide, phorone, acetonyl acetone, cyclohexanone, etc. The preferred ketones respond to the general formula $R_1$—CO—$R_2$ where $R_1$ and $R_2$ are each a straight or branched chain alkyl group, and which may be joined to form a closed ring.

The anti-oxidant components of the reaction products may be isolated and used, but in view of the useful properties of the composite product of reaction it is preferred to use it as such, freed or not, of excess unreacted reagents. It is believed that one of the components of the composite products where acetone is used with N-methyl diphenylamine, is 9,9,10-trimethyl acridan.

The reaction products may be prepared by reacting one molecular proportion of the tertiary amine with at least one molecular proportion of the ketone in the presence of an acidic condensation catalyst including iodine, hydrochloric acid, hydrobromic acid, ferrous chloride, calcium chloride, acetic acid, zinc chloride, boric acid, sulphuric acid, ferrous sulphate, ferrous phosphate, etc., preferably an iodide such as hydriodic acid or its metal salts such as ferrous iodide, etc. While operating temperatures in the range of from about 200–300° C. are desirable, lower temperatures with increased reaction times may be used, for example, temperatures as low as about 150° C.

The following examples are given in illustration of the preparation of the chemicals and their use.

EXAMPLE 1.—*Preparation of the reaction product of N-methyl diphenylamine and acetone*

N-methyl diphenylamine (16.8 parts) is autoclaved with 11.6 parts acetone in the presence of 1.5 parts $FeI_2.4H_2O$ for 30 hours at 250° C. The crude reaction product is washed with dilute alkali until the washings are free of iodine and then heated under 4 mm. pressure until the temperature of distillation reached 180° C. This procedure removes any unchanged N-methyl diphenylamine (boiling point 140° C.—4 mm.). The residue is a viscous oil useful as an antioxidant.

EXAMPLE 2.—*Preparation of the reaction product of N-ethyl diphenylamine and acetone*

N-ethyl diphenylamine (28 parts) is autoclaved with acetone (16.6 parts) in the presence of $FeI_2.4H_2O$ (1.5 parts) as catalyst for 30 hours at 258° C. The reaction product is purified as described for N-methyl diphenylamine. The portion not distilling below 200° C. at 3 mm. is usable as an antioxidant.

The effectiveness of the chemicals herein for retarding the oxidation of rubber is illustrated by the results of standard accelerated aging tests on the following commercial rubber composition, in which the parts are by weight:

Mix master batch

| | Parts |
|---|---|
| Smoked sheets | 100 |
| Carbon black | 45 |
| Zinc oxide | 5 |
| Pine tar | 3.50 |
| Zinc soap of cocoanut oil fatty acids | 3.50 |
| Sulphur | 3.00 |
| Mercaptobenzothiazole (accelerator) | 1.00 |
| | 161.00 |

To the above master batch the reaction products of acetone with N-methyl diphenylamine, and N-ethyl diphenylamine, were added in the proportion of 1.0 part to 100 parts rubber. The per cent remaining tensile on the resulting mixes before and after ageing 96 hours under 300 pounds oxygen at 70° C. are as follows:

| | Control | Reaction product of acetone and N-methyl diphenylamine |
|---|---|---|
| Unaged | 100 | 100 |
| Aged | 20 | 61 |

| | Control | Reaction product of acetone and N-ethyl diphenylamine |
|---|---|---|
| Unaged | 100 | 100 |
| Aged | 53 | 55 |

Incident to their use in paints and varnishes as aforesaid, the materials may be used as antioxidation controllers to regulate the rate of drying of finishes therefrom which dry by oxidation.

The invention may be applied to rubber generally, natural or artificially prepared, including caoutchouc, balata, gutta perca, neoprene (polychloroprene), reclaimed rubber, rubber isomers, and latices thereof.

It is also to be understood that other desired filling and compounding ingredients may be incorporated along with the preservative, for example, in the case of rubber, there may be incorporated other accelerators, softeners, etc.

The antioxidant may be incorporated in any type of rubber composition, such as those used for automobile tires and tubes, hose, belting, sheet and thread rubber, rubberized fabrics, molded goods, boots and shoes, etc., whether vulcanized in a mold, in open steam, in hot air, or in the cold by the so-called acid process. The proportion of the anti-oxidant may vary from about 0.1% to 5%, although either smaller or greater proportions may be found useful. If the material to which it is added is a liquid such as rubber cement or an oil, the antioxidant may be dissolved therein in a suitable small proportion. The antioxidant may be incorporated into solid substances by milling or mastication, and prepared for incorporation into dispersions or solutions either in powder, paste or solution form, or applied in such forms for incorporation by diffusion, to the surfaces of vulcanized or unvulcanized rubber goods.

Having thus described my invention, what I claim and desire to protect by Letters Patent is:

1. A rubber composition containing a product of reaction of a dialkyl ketone with an N-alkyl diarylamine.

2. A rubber composition containing a product of reaction of acetone with an N-alkyl diphenylamine.

3. A rubber composition containing a product of reaction of acetone with N-methyl diphenylamine.

4. A rubber composition containing a product of reaction of acetone with N-ethyl diphenylamine.

PHILIP T. PAUL.